United States Patent
Bostick et al.

(10) Patent No.: US 11,442,977 B2
(45) Date of Patent: Sep. 13, 2022

(54) AUGMENTING SEARCH QUERIES BASED ON PERSONALIZED ASSOCIATION PATTERNS

(71) Applicant: International Business Machines Corporation, Armonk, NY (US)

(72) Inventors: James E. Bostick, Cedar Park, TX (US); John M. Ganci, Jr., Cary, NC (US); Sarbajit K. Rakshit, Kolkata (IN); Craig M. Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 1355 days.

(21) Appl. No.: 14/666,380

(22) Filed: Mar. 24, 2015

(65) Prior Publication Data
US 2016/0283589 A1    Sep. 29, 2016

(51) Int. Cl.
| G06F 16/36 | (2019.01) |
| G06Q 50/00 | (2012.01) |
| G06F 16/335 | (2019.01) |
| G06F 16/332 | (2019.01) |

(52) U.S. Cl.
CPC .......... *G06F 16/367* (2019.01); *G06F 16/335* (2019.01); *G06F 16/3322* (2019.01); *G06Q 50/01* (2013.01)

(58) Field of Classification Search
None
See application file for complete search history.

(56) References Cited

U.S. PATENT DOCUMENTS

| 7,660,815 B1 * | 2/2010 | Scofield | G06F 16/951 707/999.102 |
| 7,797,421 B1 * | 9/2010 | Scofield | H04L 67/02 709/224 |
| 7,831,582 B1 * | 11/2010 | Scofield | G06F 16/951 707/706 |

(Continued)

OTHER PUBLICATIONS

Zhou et al., "Improving search via personalized query expansion using social media", Information Retrieval for Social Media, vol. 15, No. 3-4, pp. 218-242, Published on line: Feb. 24, 2012, DOI 10.1007/s10791-012-9191-2, © Springer Science+Business Media, LLC 2012.

*Primary Examiner* — Ashish Thomas
*Assistant Examiner* — Mellissa M. Ohba
(74) *Attorney, Agent, or Firm* — David K. Mattheis; Maeve Carpenter

(57) ABSTRACT

A method of augmenting a user's search query based on analysis of content contributions of the user. One or more processors gather content contributions made to a media source by a user. Topic entities are identified from content contributed by the user. Semantic and syntactic analysis are performed on the content, and attributes of topic entities are determined based on the analysis. The topic entities are grouped based on similar and/or related attributes of the topic entities. The one or more processors determine relationships between the topic entities based on the grouping and the semantic analysis of the content contributed by the user of the media source. An ontology model is generated, based on the topic entities and their interrelationships, and responsive to determining the user initiates a search query, the one or more processors present additional topic entities as selection choices for augmenting the search query.

14 Claims, 5 Drawing Sheets

(56) References Cited

U.S. PATENT DOCUMENTS

| | | | |
|---|---|---|---|
| 8,019,777 B2* | 9/2011 | Hauser | G06Q 30/02 707/769 |
| 8,341,101 B1* | 12/2012 | Treiser | G06Q 30/02 706/45 |
| 8,386,509 B1* | 2/2013 | Scofield | G06F 16/335 707/769 |
| 8,452,772 B1* | 5/2013 | Carpio | G06F 17/30864 707/737 |
| 8,645,372 B2 | 2/2014 | Diamond et al. | |
| 8,688,673 B2* | 4/2014 | Sarkar | G06F 17/30705 707/706 |
| 8,799,294 B2 | 8/2014 | Bouillet et al. | |
| 8,843,433 B2* | 9/2014 | Flinn | G06N 5/048 706/52 |
| 8,868,590 B1* | 10/2014 | Donneau-Golencer | G06F 17/3053 707/733 |
| 8,943,004 B2* | 1/2015 | Treiser | G06Q 30/02 706/12 |
| 9,092,514 B2* | 7/2015 | Cardie | G06F 17/30719 |
| 9,171,263 B2* | 10/2015 | Flinn | H04L 51/16 |
| 9,454,730 B2* | 9/2016 | Flinn | G06F 16/24575 |
| 9,614,807 B2* | 4/2017 | Spivack | H04L 67/306 |
| 9,715,493 B2* | 7/2017 | Papadopoullos | G06F 17/275 |
| 9,787,705 B1* | 10/2017 | Love | H04L 63/1425 |
| 9,836,183 B1* | 12/2017 | Love | G06T 11/206 |
| 10,296,823 B2* | 5/2019 | Hofmann | G06N 3/02 |
| 2007/0214097 A1* | 9/2007 | Parsons | G06F 17/30864 706/12 |
| 2010/0268702 A1 | 10/2010 | Wissner et al. | |
| 2012/0137367 A1* | 5/2012 | Dupont | G06F 21/00 726/25 |
| 2012/0158720 A1 | 6/2012 | Luan et al. | |
| 2012/0254074 A1* | 10/2012 | Flinn | G06Q 30/0631 706/4 |
| 2012/0254075 A1* | 10/2012 | Flinn | G06Q 30/0631 706/4 |
| 2012/0278164 A1* | 11/2012 | Spivack | G06F 16/9535 705/14.66 |
| 2012/0290518 A1* | 11/2012 | Flinn | G06N 5/048 706/12 |
| 2012/0296991 A1* | 11/2012 | Spivack | H04L 51/52 709/206 |
| 2013/0031110 A1 | 1/2013 | Bhola et al. | |
| 2013/0275429 A1* | 10/2013 | York | G06F 17/30029 707/737 |
| 2014/0075004 A1* | 3/2014 | Van Dusen | H04L 41/04 709/223 |
| 2014/0129331 A1* | 5/2014 | Spivack | G06Q 30/0255 705/14.53 |
| 2014/0181082 A1 | 6/2014 | Fries | |
| 2014/0280179 A1 | 9/2014 | Coleman | |
| 2014/0358842 A1* | 12/2014 | Flinn | G06F 16/24575 706/52 |
| 2015/0254230 A1* | 9/2015 | Papadopoullos | G06F 17/275 704/8 |
| 2015/0264092 A1* | 9/2015 | Herger | G06F 40/169 709/204 |
| 2016/0012344 A1* | 1/2016 | Flinn | H04L 51/16 706/52 |
| 2016/0364651 A1* | 12/2016 | Flinn | G06N 5/048 |

\* cited by examiner

AUGMENTING SEARCH QUERIES BASED ON PERSONALIZED ASSOCIATION PATTERNS

BACKGROUND OF THE INVENTION

The present invention relates generally to the field of social media analysis, and more particularly to augmenting search queries based on a relationship pattern determined by semantic analysis of a user's social media contributions.

Human memory is often characterized as a series of associations and interrelationships. Information stored in the mind, such as facts, incidents, and events may be interconnected to other facts, incidents, and events. For example, a person recalls a trip made to London, which causes the related flight to come to mind and a conversation on the flight regarding a book recommended for reading, which reminds the person that they wanted to join a book club offered by a local book store in their home town. The resulting path of connected topics can be considered a pattern of relationships and associations.

Items recalled from memory may be considered an entity, having a subject or topic, and may include various other attributes as well. An entity may have connecting relationships to its own attributes or to other entities and their attributes. For example, a person recalls a childhood toy that leads to a connection with to an attribute of the toy, such as a particular color of the toy. The toy's color may lead to a connection with an article of clothing of the same color, and the article of clothing leads to a connection regarding an important event to which the article of clothing was worn. The important event leads to recalling the ride to the important event in a particular car, and the model of the car is one which the user is considering to purchase. The relationships and interconnections between entities form a pattern of association unique to the person.

SUMMARY

A first embodiment of the present invention provides a method for augmenting a search query of a user, based on analysis of content contributions of the user. The first embodiment includes one or more processors that gather content contributions made to a media source by a user of the media source. The one or more processors identify topic entities from content contributed by the user of the media source. The one or more processors perform semantic analysis and syntactic analysis on the content contributed by the user of the media source. The one or more processors determine, based on the semantic analysis and the syntactic analysis, attributes of the topic entities that are identified. The one or more processors group the topic entities based on one or both of similar and related attributes of the topic entities. The one or more processors determine relationships between the topic entities based on the topic entities that are grouped and the semantic analysis of the content contributed by the user of the media source. The one or more processors generate an ontology model based on the topic entities that are identified and the relationships between the topic entities, and responsive to determining the user initiates a search query, the one or more processors present to the user, additional topic entities as selection choices for augmenting the search query, based on the ontology model.

A second embodiment provides a computer program product comprising a computer-readable storage medium having program instructions embodied therewith, the program instructions executable by one or more processors that provide a method in which the one or more processors gather content contributions made to a media source by a user of a the media source. The one or more processors identify topic entities from content contributed by the user of the media source. The one or more processors perform semantic analysis and syntactic analysis on the content contributed by the user of the media source. The one or more processors determine, based on the semantic analysis and the syntactic analysis, attributes of the topic entities that are identified. The one or more processors group the topic entities based on one or both of similar and related attributes of the topic entities. The one or more processors determine relationships between the topic entities based on the topic entities that are grouped and the semantic analysis of the content contributed by the user of the media source. The one or more processors generate an ontology model based on the topic entities that are identified and the relationships between the topic entities, and responsive to determining the user initiates a search query, the one or more processors present to the user, additional topic entities as selection choices for augmenting the search query, based on the ontology model.

A third embodiment of the present invention provides a computer system including one or more computer processors, one or more computer-readable storage media, and program instructions stored on the computer-readable storage media for execution by at least one of the one or more processors, to provide a method in which, the one or more processors gather content contributions made to a media source by a user of a the media source. The one or more processors identify topic entities from content contributed by the user of the media source. The one or more processors perform semantic analysis and syntactic analysis on the content contributed by the user of the media source. The one or more processors determine, based on the semantic analysis and the syntactic analysis, attributes of the topic entities that are identified. The one or more processors group the topic entities based on one or both of similar and related attributes of the topic entities. The one or more processors determine relationships between the topic entities based on the topic entities that are grouped and the semantic analysis of the content contributed by the user of the media source. The one or more processors generate an ontology model based on the topic entities that are identified and the relationships between the topic entities, and responsive to determining the user initiates a search query, the one or more processors present to the user, additional topic entities as selection choices for augmenting the search query, based on the ontology model.

DETAILED DESCRIPTION

Embodiments of the present invention recognize that search queries that are performed on existing systems are based on search term input, and may include historical actions taken by others, or taken by the user, to augment search query terms. In other situations, existing systems may augment query term input based on the most frequent or common terms used by others based on large populations. Individuals performing search queries have a particular set of relationships between topics, based on the unique associations the individual has formed. The particular relationships can be referred to as a pattern of association in which a particular instance of a first topic is associated with one or more instances of other topics, related in some manner with the first topic. Each of the other topics may be further related to still more topics, creating paths and patterns of association that link topics by relationships.

Embodiments of the present invention, responsive to determining a search query has been submitted by a user, provide follow-on search queries, analogous to the pattern of association unique to the user, based on a relationship pattern determined by analysis of social media contributions of the user. Embodiments of the present invention assume a graph exists, or can be generated, based on ontology-based text mining of social media content to form a data graph of entities (topics or subject matter) from the social media, and the relationships between the entities. Natural Language Processing (NLP) is used to identify the entities and determine what exists in the unstructured data of the social media content. NLP techniques are applied to derive the semantic models from the unstructured data and determine the relationships between the entities. The classification of entities and the modeling of the relationships between the entities, forms an ontology model which can be graphically represented.

Embodiments of the present invention include augmenting a search query submitted by a particular user by presenting a graphical display of topic entities and their interrelationships, generated by analysis of media contributions made by the particular user. Discussion and description herein may reference social media as a source of user-based content contributions. For purposes of example and clarity, however, embodiments of the present invention may apply to multiple types of media contributions made by a user, and are not limited to social media applications.

Figure 1:
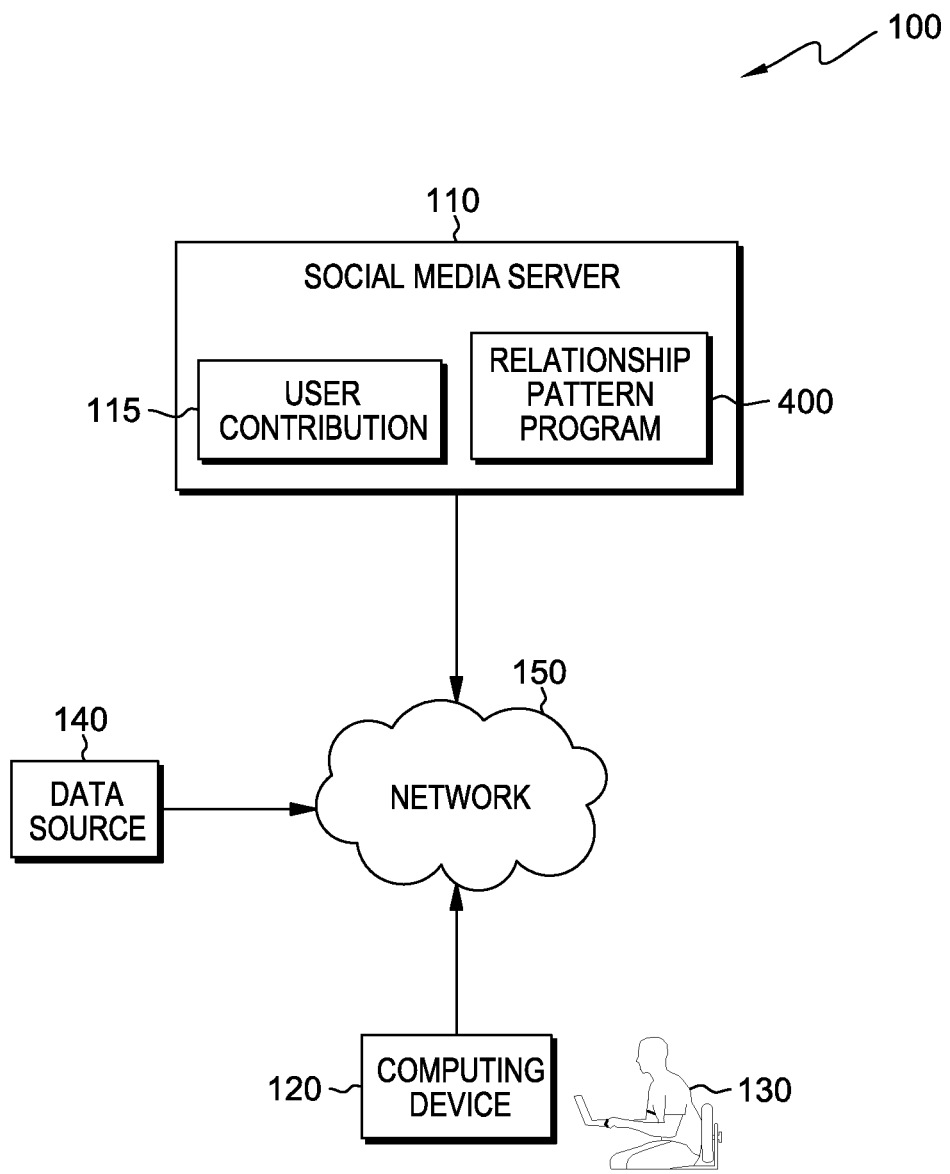
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed computer processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

FIG. 1 includes computing device 120, operated by user 130, data source 140, social media server 110, which includes user contribution 115, and relationship pattern program 400, all interconnected via network 150.

Network 150 may be, for example, a local area network (LAN), a telecommunications network, a wide area network (WAN), such as the Internet, a virtual local area network (VLAN), a cable broadcasting delivery network, a satellite broadcasting delivery network, or any combination that can include wired, wireless, or optical connections. In general, network 150 can be any combination of connections and protocols that will support communications between data source 140, computing device 120, and social media server 110, and the operation of relationship pattern program 400, within distributed data processing environment 100, in accordance with embodiments of the present invention.

User contribution 115 is a collection of social media content contributed by a particular user, for example user 130, on one or more social media sites managed by social media server 110. User contribution 115 includes the text content of postings generated by user 130, the images submitted to the social media site by user 130, along with annotations associated with the images, the comments submitted by user 130 to other postings and other comments, indicators of "like" submitted by user 130 of postings by other users, and topics and other users that user 130 "follows". User contribution 115 also includes timeframe information associated with the content contributed by the user, such as user 130, which can be applied to determine the time-based relationship of one item of contribution to another item of contribution.

Data source 140 is a collection of publicly available electronic media that includes knowledge bases, which may be used by relationship pattern program 400 in determining the syntactical, semantical, and contextual analysis of social media content from user contribution 115. For example, data source 140 may include content from, or access to, Wikipedia®, which is a web-based encyclopedia that is collaboratively written and maintained, and WordNet® (Wikipedia is a registered trademark of the Wikipedia Foundation, WordNet is a registered trademark of The Trustees of Princeton University, Princeton, N.J., USA), which is a web-based lexical database for the English language. WordNet groups English words into sets of synonyms called synsets, provides short definitions and usage examples, and includes a number of relations among these synonym sets or their members. In some embodiments of the present invention, data source 140 is a source of information that is accessible by relationship pattern program 400 to perform NLP techniques and semantic analysis of text mining that is extracted from user contribution 115 of social media server 110. For example, for a social media posting that includes mention of the city London, Wikipedia may provide information as to the country and continent in which London is located, the latitude and longitude of London, the known population, landmarks within London, tourist attractions of London, current news for London, and possibly other topic entities related to London. WordNet may enable relationship pattern program 400 to determine the parts of speech (POS) for text words within social media contribution content, such as user contribution 115, and determine syntactical and semantical information associated with the content.

Computing device 120 provides user 130 access to social media server 110 via network 150. Computing device 120 may be a desk top computing device, a rack mounted computing device, a mobile computing device, or any other electronic device, or computing system, capable of performing program instructions, and receiving and sending data. In other embodiments, computing device 120 may represent a computing system utilizing multiple computers as a server system, such as in a cloud computing environment. In yet other embodiments, computing device 120 can be a laptop computer, a tablet computer, a netbook computer, a personal computer (PC), a desktop computer, a personal digital assistant (PDA), a smart phone, or any programmable electronic device capable of communicating with social media server 110 via network 150. In another embodiment, computing device 120 can be a computing system utilizing clustered computers and components (e.g., database server computer, application server computers, etc.) that act as a single pool of seamless resources when accessed within distributed data processing environment 100. Computing device 120 may include internal and external hardware components, as depicted and described with reference to FIG. 5.

Social media server 110 includes user contribution 115 and relationship pattern program 400. Social media server 110 operates one or more social media sites, providing access to participating users, such as user 130, and maintaining the content contributed by users, as well as information associated with the content. The social media content maintained by social media server 110 may include, but is not limited to, text postings, comments on postings, connections between users of the social media site, images and/or video submitted to the social media site, as well as metadata and annotations associated with the images and/or video, and status and rankings of users of the social media site.

Social media server 110 is a computing device that includes relationship pattern program 400, in accordance to an embodiment of the present invention. Social media server 110 may be a desk top computing device, a rack mounted computing device, a blade server, a management server, a mobile computing device, or any other electronic device or computing system capable of performing program instructions and receiving and sending data. In other embodiments, social media server 110 may represent a computing system utilizing multiple computers as a server system, such as in a cloud computing environment. In yet other embodiments, social media server 110 can be a laptop computer, a tablet computer, a netbook computer, a personal computer (PC), a desktop computer, a personal digital assistant (PDA), a smart phone, or any programmable electronic device capable of connecting and/or communicating with user contribution 115, computing device 120, and data source 140, via network 150. In another embodiment, social media server 110 can be a computing system utilizing clustered computers and components (e.g., database server computer, application server computers, etc.) that act as a single pool of seamless resources when accessed within distributed data processing environment 100. Social media server 110 may include internal and external hardware components, as depicted and described with reference to FIG. 5.

Relationship pattern program 400 performs text mining on content contributions to social media made by a user, and extracts keywords from the content. Relationship pattern program 400 performs syntactic and semantic analysis on the content contributions, such as user contribution 115 by user 130, and clusters keywords based on common and/or related attributes of the keywords, as determined by the semantic analysis. The syntactical and semantic analysis are used to determine the topics or entities of the social media content of a particular user and determine relationships between the entities. Syntactical analysis parses the content into individual words and their relative positions within the content. The words are assigned a type of speech, such as nouns, verbs, and whether they are included in phrases, such as prepositional phrases. Relationship pattern program 400 determines keywords from the syntactical analysis, and applies semantic analysis techniques in which the contextual meaning of the words and phrases are determined.

Semantic analysis techniques include determining the meaning of the words and phrases of the social media contributions, by considering the context of keywords within phrases of the content contributions. In some embodiments of the present invention, semantic analysis involves access of online dictionaries and databases that include the meanings of the words and phrases.

By determining the topic entities and the relationships between the entities, based on using the social media content of a particular user, a relationship pattern associated with the particular user is generated. In some embodiments of the present invention, the relationship pattern is generated in the format of graphical connections between entities, which depicts the relationship pattern the particular user practices while participating in one or more social media sites maintained by, or in communication with, social media server 110. The graphical representation of the relationships between the social media topic entities is used to augment search queries submitted by the particular user, providing suggested query input of non-obvious relationships analogous to the particular user's social media patterns.

Relationships have magnitude that can be thought of as a "strength of bond" between topic entities. The relationship magnitude may be determined by one or a combination of: the frequency of association; the duration of contributions regarding association of entities; the currency of association; and the volume of content associating topic entities within the social media content. In some embodiments of the present invention, the relationship strength between entities may be positively reinforced (increase of relationship strength) by the user selecting one or more of the augmented search query terms provided by relationship pattern program 400. Similarly, in other embodiments, the relationship strength may be negatively reinforced (reducing the relationship strength) by the lack of use, or the user ignoring, the one or more augmented query terms provided by relationship pattern program 400. In still other embodiments, the relationship strength, or magnitude, may be determined from direct input of the user by editing the relationship pattern graph.

Relationship pattern program 400 includes a process that continuously operates in the background, analyzing the social media data and continuously building, augmenting, and adjusting entities and relationships on the graph. When a user performs a search, relationship pattern program 400 provides additional search query relationships that may differ from traditional recommendations, but are particular to a user and based on the relationship pattern of the user's media content contributions.

Figure 2:
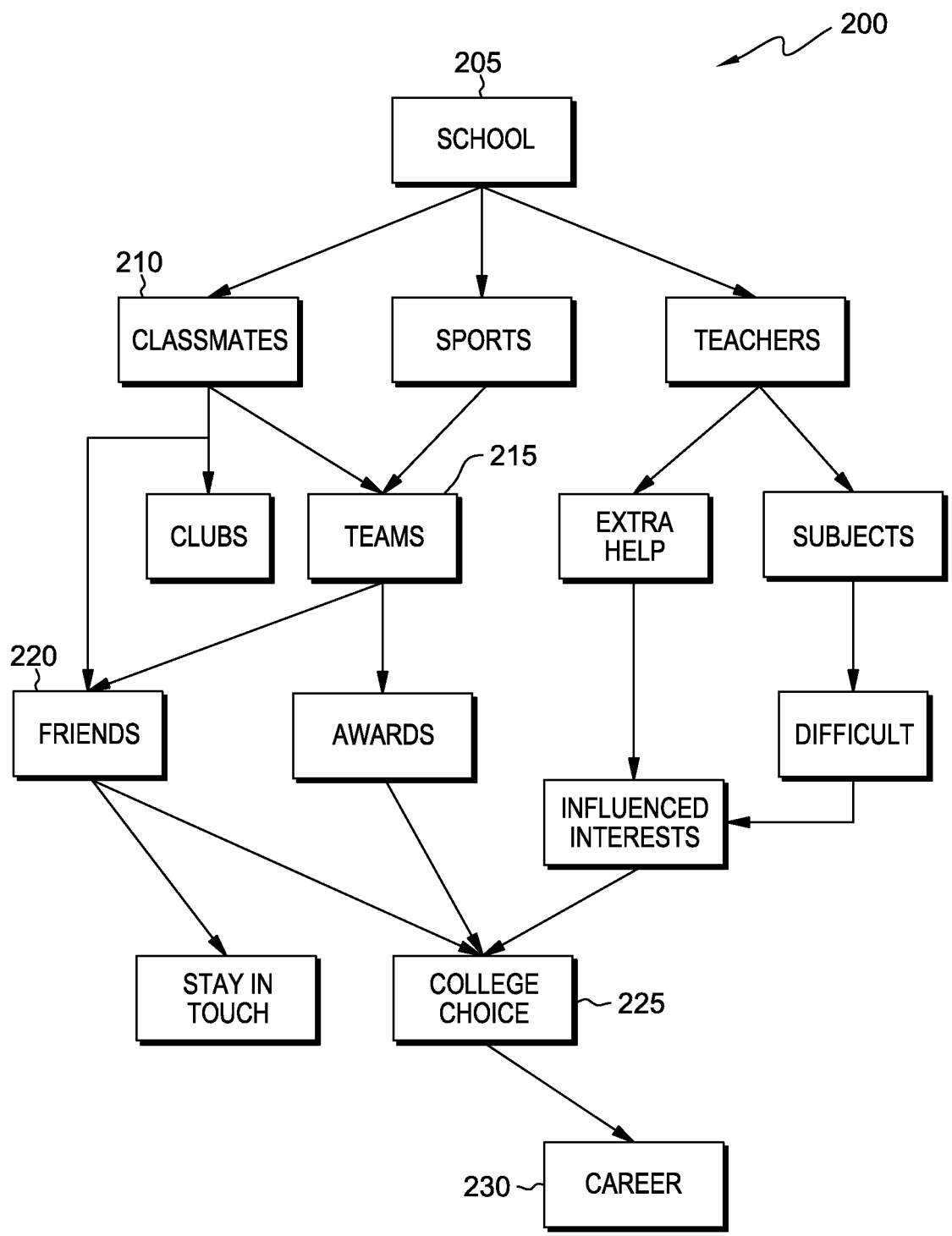
FIG. 2 is an exemplary relationship diagram illustrating a pattern, displayed as a graphical representation of associations of entities of a media content contributor, in accordance with an embodiment of the present invention.

FIG. 2 is an exemplary relationship diagram illustrating pattern 200, displayed as a graphical representation of associations of entities of a media content contributor, in accordance with an embodiment of the present invention. Often, when people recall information, the recalled topic triggers another topic, and that topic in turn triggers yet another topic, which triggers something else. This results in a sort of path that links entities that are recalled, and the relationships of entities forming the path are based on entity associations formed by, and unique to, the experiences of a particular person.

Relationship pattern 200 includes topic entities 205, 210, 215, 220, 225, and 230, as well as un-numbered entities, which together complete a relationship pattern. Pattern 200 is representative of the particular user's memory association patterns that are initiated with topic entity 205, which includes a topic of "school". Topic entity 205 is depicted as having associated relationships with multiple topics, which include the topics of "teachers", "sports", and topic entity 210 which includes the topic of "classmates". The topic entities associated with the topic of school indicate a relationship pattern unique to the particular user. For example, when considering the topic of school, the particular user's associates school with the topics of teachers, sports, and topic entity 210, classmates.

For the particular user, pattern 200 depicts the topic of teachers leading to the topic entities of receiving extra help from some teachers and the topic entity of the subjects that the teachers taught. The topic entity of receiving "extra help" from certain teachers had an impact of influence on the particular user, as is depicted in the topic entity of extra help leading to the topic entity of having "influenced interests" of the particular user. The topic entity of subjects taught leads to the topic entity of how difficult certain subjects were for the particular user, and the difficulty had the effect of leading to the topic entity of having influenced the interests of the particular user. The topic entity of "sports" that the particular user participated in, is depicted as leading to topic entity 215, "teams", in which specific teams from school sports are recalled by the particular user.

Topic entity 210, which includes the particular user's topic of "classmates", is depicted as leading to topic entity 215, teams, topic entity "clubs", and topic entity 220, "friends". For relationship pattern 200 of the particular user, one of the relationships with topic entity 210, classmates, ends with topic entity "clubs", in which the user recalls one or more of the school clubs that classmates participated in. Topic entity 215 is depicted as leading to two topic entities; topic entity "awards", which further leads to topic entity 225, "college choice", and topic entity 220, "friends". Topic entity "awards" associates the sports teams that the user participated in with classmates and received awards for the team's success.

Topic entity 220, "friends", is depicted as leading to the topic entity to "stay in touch", which includes a desire to regularly communicate with one or more of the friends of topic entity 220. Topic entity 220, "friends", also leads to topic entity 225, "college choice", as some of the particular user's classmate friends planned to attend a certain college that the user was considering. Topic entity 225, "college choice", is depicted as leading to topic entity 230, "career", indicating the association of the choice of colleges as leading to the career the particular user is pursuing.

Pattern 200 illustrates the flow of associations of topic entities by the particular user, for example user 130, as the particular user recalls topic entity 205, "school". The associated topic entities lead to other topic entities, and they in turn lead to yet other topic entities. In some cases, multiple topic entities lead to a common topic entity, for example, the topic entity of having influenced interests, the topic entity of awards, and topic entity 220, "friends", all lead to a common topic of topic entity 225, "college choices". Although pattern 200 is intentionally truncated for exemplary purposes, topic entities depicted, as well as many which are not depicted, continue to generate additional associations for the particular user, representing the interconnected relationships formed by the particular user's unique experiences.

Embodiments of the present invention include methods in which a relationship pattern is generated that reflects the associations of a particular user's experiences, based on the NLP of social media contributions by the particular user. NLP is used to identify the topic entities found by ontology based text mining of the media content contributions of the particular user, such as social media contributions, and semantic and syntactic analysis is used to determine the relationships between the topic entities. The topic entities and relationships between the entities form an ontology model, which can be represented graphically with topic entities as nodes, and relationships as edges linking the nodes. Hereafter, user 130, of FIG. 1, will be referred to as an example of the particular user contributing content to a social media forum.

Figure 3:
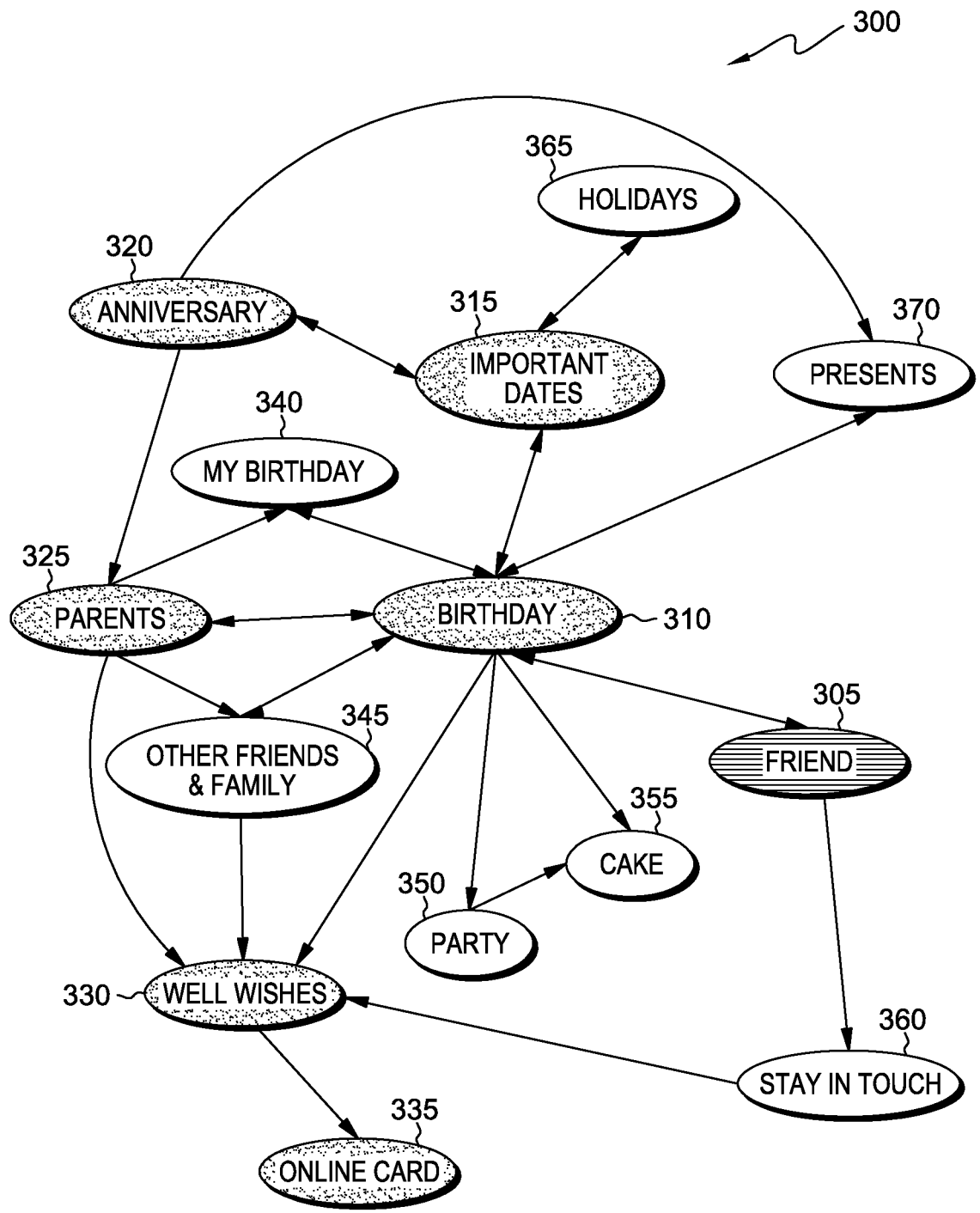
FIG. 3 is an exemplary relationship diagram illustrating a pattern, displayed as a graphical representation of topic entities, based on content contributions and associations of a media content contributor, in accordance with an embodiment of the present invention.

FIG. 3 is an exemplary relationship diagram illustrating pattern 300, displayed as a graphical representation of topic entities, based on content contributions and associations of a media content contributor, in accordance with an embodiment of the present invention. In some embodiments of the present invention, a relationship pattern that reflects the association of topic entities of a user are generated based on an analysis of the user's social media contributions over time. Text mining and syntactical analysis are performed on the social media contributions to identify topic entities, and semantic analysis is performed on the contributions to determine the relationships between the topic entities. The topic entities and their relationships are combined, forming an ontology model unique to the particular user, which can be displayed in a graphical representation.

Relationship pattern 300 illustrates a portion of an ontology model generated from the social media contributions of a user, for example user 130 (FIG. 1). Pattern 300 includes the topic entities: friend 305, birthday 310, important dates 315, anniversary 320, parents 325, well wishes 330, online card 335, my birthday 340, other friends & family 345, party 350, cake 355, stay in touch 360, holidays 365, and presents 370.

The topic entities of relationship pattern 300 include multiple relationships, some of which are depicted as unidirectional relationships and others as bi-directional relationships. For example, the topic entity birthday has two way relationships with presents 370, important dates 315, my birthday 340, parents 325, other friends and family 345, and friend 305, but one-way relationships with cake 355, party 350, and well wishes 330. The exemplary relationships presented in pattern 300 indicate that, in some cases, a topic entity may trigger another entity, such as the topic important dates triggering the topic entity holidays 365, and topic 365 in turn can trigger the topic entity important dates 315. In other cases, a relationship may trigger a topic entity in one direction, such as friend 305 triggering the topic entity stay in touch 360.

In some embodiments of the present invention, the topic entities and relationships are represented graphically by the topic entities assuming node positions of the graph, and the relationships between the topic entities assuming edge positions that connect the nodes of the graph. The relationships between nodes of the graph include a dimension of the strength, or magnitude, of the relationship. In some embodiments, the magnitude of the relationship may correspond to the frequency of which the topic entities are associated within the social media contributions of user 130. Other consideration for determining the magnitude of the relationship between topic entities includes the quantity of media contribution that includes the association of topic entities, the duration of association, such as the association occurring in media contribution consistently over long periods of time or occurring for a short period of time, then occurring infrequently, or not at all. In some embodiments, the magnitudes of the relationships may be represented graphically as weights of edges connecting topic entity nodes.

In some embodiments of the present invention, topic entities include attributes that may further establish relationships with other topic entities. The attributes of entities may enable clustering techniques to group topic entities and contribute to determining the weights of edges connecting topic entities on an ontology model graph of a media user. Examples of attributes include, but are not limited to, data corresponding to, who (person), what (thing), when (timing), where (location), why (reason), and how (method). Attributes, in turn, may have dimensions that further enable clustering and grouping of topic entities.

Pattern 300 includes a progression, indicated by the shading of entities, which forms a path of sequential triggering of topic entities. For example, user 130 often chats with a friend, friend 305, and an attribute of friend 305 is birthday 310. Birthday 310 has many relationships with other topic entities, one of which is that a birthday is an important date, triggering important dates 315. A related topic entity of important dates 315 is the relationship with anniversary 320, which is an important date for user 130. Anniversary 320 has a relationship with the topic entity parents 325, suggesting that the topic entity anniversary leads to the topic entity of parents, presumably those of user 130. Following the path of topic entities sequentially triggered, user 130's consideration of the topics, anniversary, and parents, triggers a topic entity of expressing well wishes 330, which in turn leads to the topic entity of online card 335, which user 130 considers to acknowledge an upcoming anniversary of user 130's parents. The path of sequential triggering of the topic entities leading to online card 335 indicates a unique pattern of association, otherwise referred to as a relationship pattern that applies specifically to user 130, as it is generated from the social media contributions of user 130.

Figure 4:
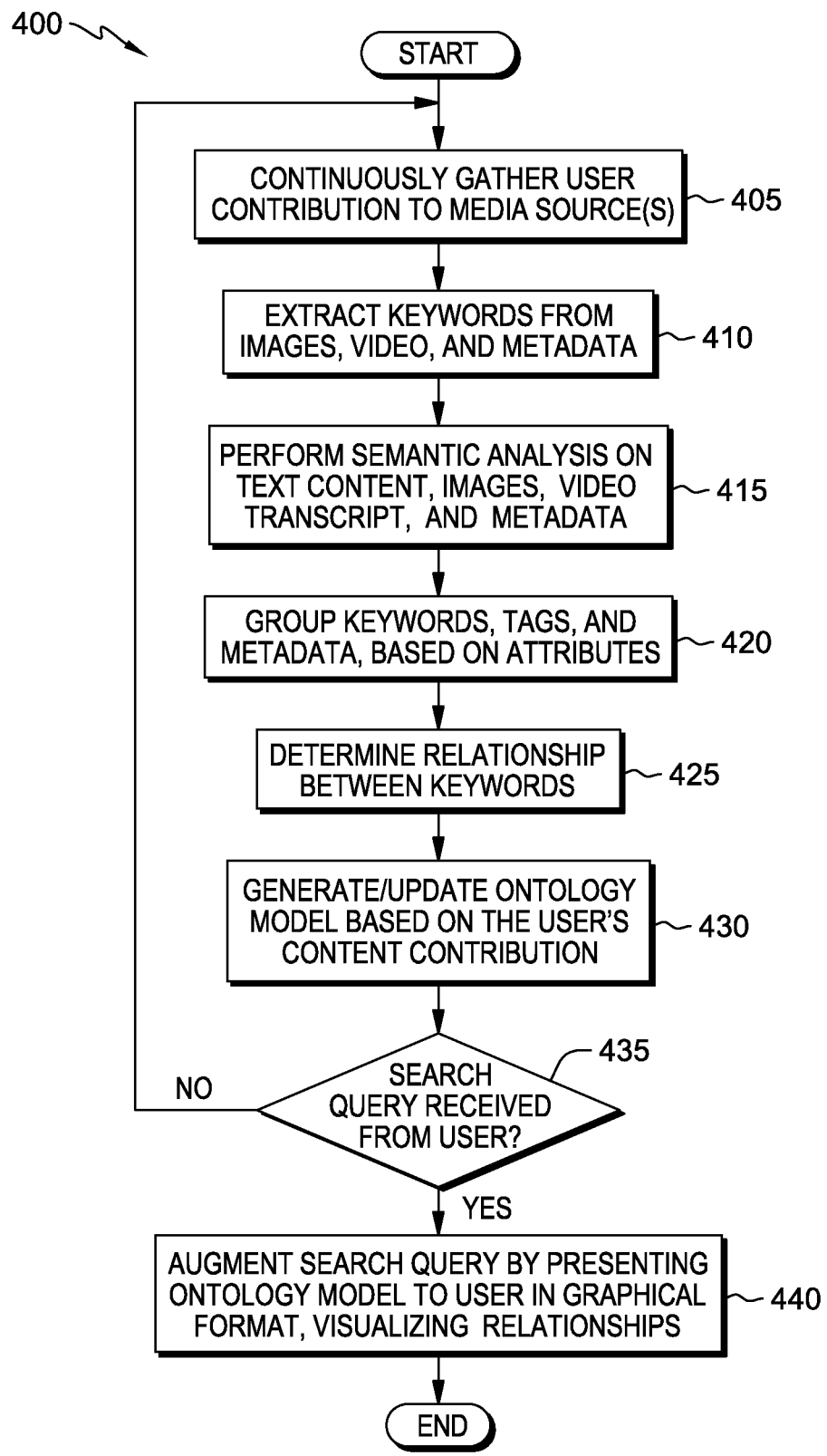
FIG. 4 illustrates operational steps of a relationship pattern program, inserted on a computing device within the distributed data processing environment of FIG. 1, in accordance with an embodiment of the present invention.

FIG. 4 illustrates operational steps of relationship pattern program 400, inserted on social media server 110, within distributed data processing environment 100 of FIG. 1, in accordance with an embodiment of the present invention. One portion of relationship pattern program 400 operates continuously in the background by analyzing the media data and continuously building and adjusting relationships between topic entities for a particular user, such as user 130. The other portion of relationship pattern program 400 is engaged when user 130 performs a search, and in some embodiments of the present invention, relationship pattern program 400 presents additional search query recommendations, based on a generated ontology model, in a graphical representation that depicts the relationships between query topic recommendations.

Relationship pattern program 400 repeatedly gathers user content contributions to media sources (step 405). In one embodiment of the present invention, relationship pattern program 400 gathers user content contributions at previously determined time intervals, for example, hourly, or daily. The contributions made by a particular user, which may include, but are not limited to, text, photographs, videos, and audio files posted by the particular user, commenting, by the particular user, on content posted by other users, and content from chats and messages sent and received by the particular user. For example, relationship pattern program 400 gathers the text content and photographs posted by user 130 and gathers comments made by user 130 regarding postings by other users on a social media site managed by social media server 110. The gathered content contributed by user 130 is associated with user 130.

Having gathered user contribution to social media source(s), relationship pattern program 400 extracts keywords from text, images, video, and metadata content (step 410). Relationship pattern program 400 performs text mining on the content gathered from the user contribution to the media source. To extract and identify keywords from the content, relationship pattern program 400 performs syntactic analysis, parsing the text content and, in some embodiments of the present invention, may include NLP tools and techniques to identify the keywords that may form the topic entities. For example, relationship pattern program 400 parses the text content posted by user 130 on a social media site on social media server 110, and determines the parts of speech of the text words. Relationship pattern program 400 identifies the nouns as potential keywords, noting the frequency of occurrence and position of occurrence within the text context. Additionally, relationship pattern program 400 uses optical character recognition (OCR) on images and video content included in user 130 social media contributions, and determines text content from the OCR analysis. In some embodiments, relationship pattern program 400 may include use of speech recognition tools to determine a transcript of an audio component of video content included within user 130's contribution to the one or more social media sources. Relationship pattern program 400 also parses the metadata associated with images and video content and determines keywords that may form topic entities.

Having extracted keywords from the content contributions to one or more media sources, relationship pattern program 400 performs semantic analysis on the text, image, video transcript, and metadata of the contribution content (step 415). Semantic analysis is applied to the unstructured data of the user's content contributions to generate a semantic model that provides meaning to the keywords of the content, enabling determination of subject, predicate, and attributes associated with the identified keywords. For example, text content contributed by user 130 may include a person by name and an activity. Semantic analysis may determine the gender and an interest of the person, and may determine the location of the activity, or the interaction of the activity with other persons, or other activities. The semantic analysis may be able to determine a timeframe of the activity, as well as a method by which the activity is performed.

Relationship pattern program 400 groups keywords, tags, and metadata, based on the attributes (step 420). To form a model analogous to the association patterns of a user, an ontology is applied to the analyzed content of the media contributions; the ontology being structured with classes and relationships. The classes are generated from the extracted keywords which, with semantic analysis, will become the topic entities of the ontology model. The classes of the model are clustered and grouped based on similar or related properties of the entities. A multitude of keywords extracted from text and metadata content, which have common or related attributes, may be clustered into a set of primary subjects and designated as topic entities.

Having performed clustering and grouping of keywords, tags, and metadata from the social media content contribution by the user, relationship pattern program 400 determines relationships between the keywords (step 425). The semantic analysis corresponding to the identified keywords is used to determine the predicate that associates a subject keyword to an object keyword, forming a "triple", which is a combination of two topic entities and a relationship between the entities. Relationship pattern program 400 determines the relationships between topic entities based on the semantic analysis and grouping of keywords having common attributes.

For example, having extracted and identified a plurality of keywords from the media content contributions of user 130 and performing semantic analysis on the media content, relationship pattern program 400 groups and clusters keywords based on common and related attributes. Based on the attributes and the semantic model, relationships are determined between keywords, and the relationship strength or magnitude is determined. The relationship magnitude may be based on, but not limited to, frequency, duration, volume of references, and currency of keywords.

Having determined the relationship between keywords, relationship pattern program 400 generates an initial ontology model, or updates an existing ontology model, based on the user's content contribution (step 430). Relationship pattern program 400 generates an initial ontology model containing topic entities from grouped keywords connected by relationships that are determined from the semantic model and the common or related attributes of the grouped keywords. The interconnection of triples, which include topic entities and their relationship, forms the ontology model, which can be represented graphically. Relationship pattern program 400 continuously identifies topic entities from keywords extracted from the content contributions of the user, and determines relationships between the entities, adding new relationships, changing existing relationships, and possibly removing relationships. The edge weights that are indicative of the strength of relationships between entities, are adjusted by relationship pattern program 400, reflecting changes in the content contribution of an online media source submitted by the user. Relationship pattern program 400 determines, updates, and deletes nodes, edges, and edge weights, of the ontology model graph to reflect the additions and changes of analyzed content contributions. In some embodiments of the present invention, the edge weights are read and used in the analytics to provide a path through the network of topic entities.

For example, relationship pattern program 400, having generated an initial ontology model of interconnected triples, extracts additional keywords from contributions by user 130 on a social media site managed by social media server 110. The keywords and contribution content are analyzed and grouped, producing the topic entities "house" and "mortgage". Semantic models, and common and related attributes of the keywords and content, determine the relationship to be "houses have mortgages", and additional relationships are added that include "houses have addresses", and "mortgages require payments". Relationship pattern program 400 updates the ontology model, represented graphically, to include the topic entities as nodes and the relationships as edges with determined weights. Relationship pattern program 400 may further adjust the weight of existing edges if the additional content indicates a currency, frequency, or other measure of relationship strength between entities.

Relationship pattern program 400 determines whether a search query has been received from the user (decision step 435), and determining that a search query has not been received from the user, (step 435, "NO" branch), relationship pattern program 400 returns and continues gathering user content contributions to the one or more media sources (step 405), and proceeds as described above.

Determining that a search query has been received from the user (step 435, "YES" branch), relationship pattern program 400 augments the search query by presenting the ontology model to the user in a graphical format, visualizing relationships (step 440). In some embodiments of the present invention, the ontology model is displayed as a graph in which the nodes are the individual or grouping of keywords (topic entities) and the edges connecting the nodes are the relationships that have a weight (strength or magnitude). In response to determining that a user has initiated a search query on a media site, for example, a social media site, relationship pattern program 400 presents at least a portion of the graphical display of the ontology model, indicating the topic entities and relationships that are based on one or more topic entities of the user's initial search query, offering the selection of additional topic entities as selection choices for augmenting the search query. The augmented search query topic entities are based on the media content contributions of the user, and reflect associations unique to the user, offering alternative relationships between topic entities that are not available by traditional query association techniques, and are particular to the user.

For example, relationship pattern program 400 determines that user 130 has submitted a search query on a social media site managed by social media server 110. The search query includes the topic of "birthday", and relationship pattern program 400 identifies topic entities having relationships with the topic "birthday" within a portion of the ontology model graph generated from user 130's social media contributions (FIG. 3). Relationship pattern program 400 displays a graph that includes the topic entities immediately connected to the topic "birthday", and may include indicators of the strength of the relationship between the topic "birthday", and related topic entities, such as important dates 315, friend 305, and parents 325. Relationship pattern program 400 also displays other related topic entities that may have weaker relationship with the topic "birthday", such as my birthday 340, cake 355, party 350, and other friends and family 345. The additional topic entities augment the initial search query of user 130, offering alternatives analogous to user 130's association patterns.

Relationship pattern program 400 includes explicit information from the content contributions of a user on a media site, such as a social media site. In some embodiments, relationship pattern program 400 may include information based on instances in which a user may have no contribution content regarding a relationship between two particular topic entity nodes; however, relationship pattern program 400 determines that multiple users have a similar relationship between the particular nodes or a path between nodes. In such embodiments, relationship pattern program 400 may apply the relationship and particular nodes to the user as implicit information.

Embodiments of the present invention offer the value proposition of a user participating in a variety of media sources (sites), and as long as the sources have access to the ontology model graphs, also referred to as knowledge graphs, which are continuously being built in the background, a search query input on the site can be augmented with additional search query options, unique to the user, and receive more valuable search results.

For example, a user may navigate online to a retail sales site and, for a product query, the user may receive a tangential recommendation based on what a majority of previous users purchased in response to the particular query. Embodiments of the present invention include recommendations in a graphical format that displays the relationships, based on the particular associations and relationship patterns of the user, and includes recommendations particular to that user. Online sites and recommendation processes would benefit from access to the ontology model graphs of users that submit search queries.

In response to presentation of the graphical format of the ontology model of topic entities and their relationships, relationship pattern program 400 ends this component; however, the component that continuously monitors, analyzes content contributions, and updates the ontology model graph, remains operating in the background.

Figure 5:
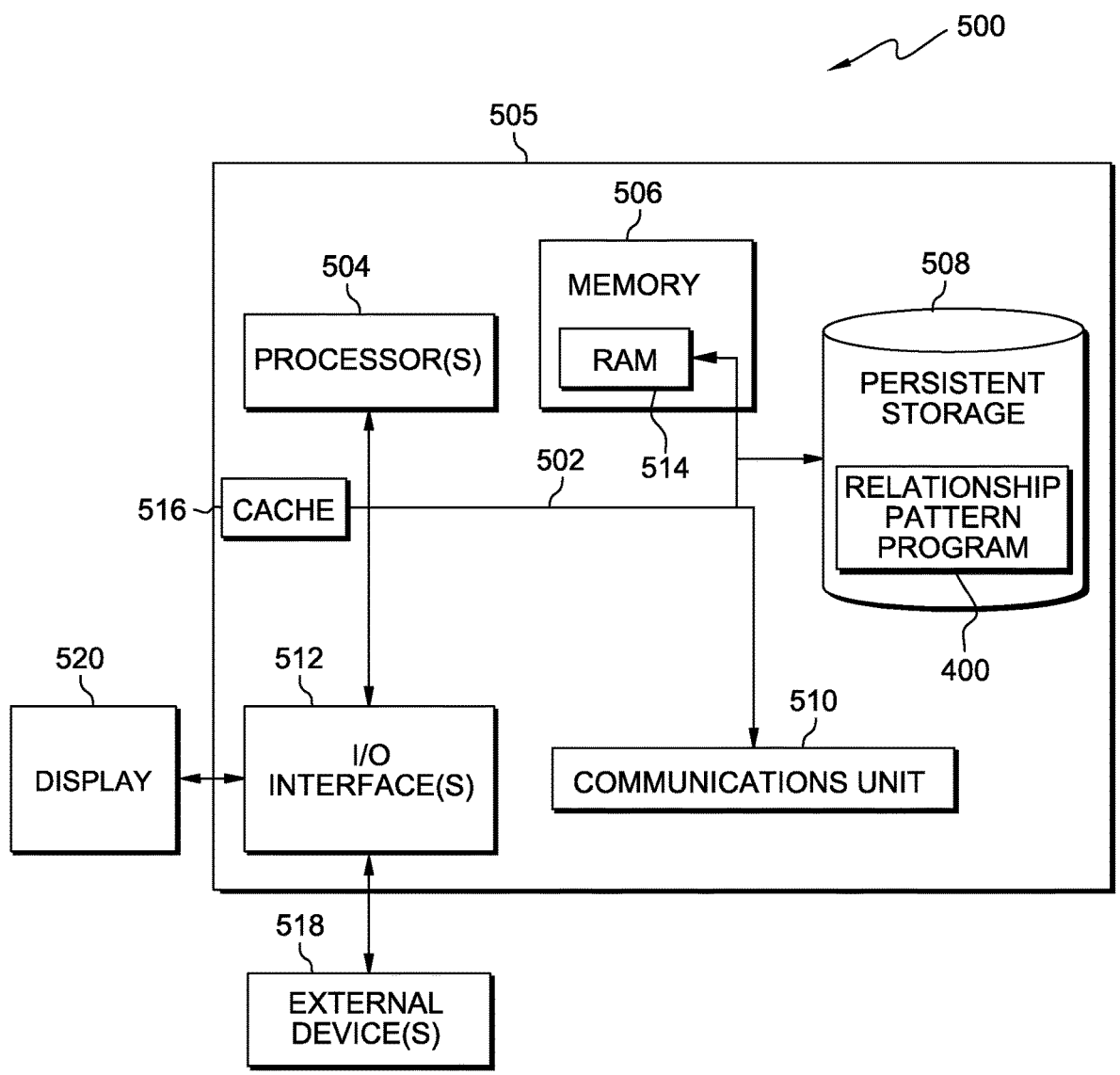
FIG. 5 depicts a block diagram of components of a social media server operating the relationship pattern program, in accordance with an embodiment of the present invention.

FIG. 5 depicts a block diagram of components of computing device 505, capable of executing relationship pattern program 400, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 505 includes communications fabric 502, which provides communications between computer processor(s) 504, cache memory 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514. In general, memory 506 can include any suitable volatile or non-volatile computer-readable storage media.

Relationship pattern program 400 is stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of distributed data processing environment 100. In these examples, communications unit 510 includes one or more network interface cards. Communications unit 510 may provide communications through the use of either or both physical and wireless communications links. Relationship pattern program 400 may be downloaded to persistent storage 508 through communications unit 510.

I/O interface(s) 512 allows for input and output of data with other devices that may be connected to computing device 120 and social media server 110. For example, I/O interface 512 may provide a connection to external devices 518, such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., relationship pattern program 400 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for augmenting a search query of a first user, based on analysis of electronic content contributions of the first user, the method comprising:

one or more computer processors gathering electronic content contributions submitted to a media source and generated by a first user of the media source and timeframe information associated with the electronic content contributions, wherein the electronic content contribution includes generation of electronic content by the first user and response actions by the first user to the electronic content posted by other users;

the one or more computer processors performing semantic analysis and syntactic analysis on the electronic content contributed by the first user of the media source;

the one or more computer processors identifying topic entities from the electronic content contributed by the first user of the media source, based on the semantic analysis and syntactic analysis performed on the electronic content contributed by the first user of the media source;

the one or more computer processors determining, based on the semantic analysis and the syntactic analysis, attributes of the identified topic entities;

the one or more computer processors grouping the identified topic entities based on related attributes of the identified topic entities;

the one or more computer processors determining relationships between the identified topic entities including time-based relationships, based on one or more groups of the identified topic entities and the semantic and syntactic analysis of the electronic content contributed by the first user of the media source;

the one or more computer processors determining a strength of the relationships, respectively, between pairs of the topic entities indicated by a magnitude, wherein the magnitude is based on a frequency of association of the respective pairs of topic entities, a currency of the respective pairs of topic entities, a duration of association of the respective pairs of topic entities over a time period, and a quantity of content associating keywords of the respective pairs of topic entities;

the one or more computer processors generating a graph based on an ontology model comprised of a grouping of a plurality of the identified topic entities from the electronic content contributed by the first user, and the relationships between the identified topic entities, including the magnitude indicating the strength of the relationships, respectively, between the respective pairs of identified topic entities; and the one or more computer processors responsive to determining that a search query has been initiated by the first user, presenting to the first user, the graph of additional topic entities for augmenting the search query from the graph, based on the ontology model, wherein the graph is represented by the plurality of the identified topic entities as nodes of the graph, the relationships between the plurality of the identified topic entities as edges of the graph, and the edges indicating the magnitude of the strength of the relationships interconnecting the nodes of the graph.

2. The method of claim 1, wherein the content contributions include one, or a combination of: posted text, posted comments, likes, tags, chat content, users followed, topics followed, posted image metadata, and transcripts of posted video.

3. The method of claim 1, wherein the media source is one or more network based social media sites.

4. The method of claim 1, wherein the ontology model includes a set of interrelated triples that include a topic entity as a subject, a second topic entity as an object, and a relationship between the subject and object as a predicate.

5. The method of claim 1, wherein the graph based on the ontology model is updated in response to analysis of an additional content contribution by the one or more computer processors performing semantic analysis and syntactic analysis on the content contributed by the user of the media source user.

6. The method of claim 1, wherein a relationship between topic nodes is positively reinforced by use of augmented search query topics from the graph based on the ontology model, and the relationship between topic nodes is negatively reinforced by a lack of use of the augmented search query topics from the graph, wherein a positive reinforcement and a negative reinforcement of the relationship between topic nodes modifies a magnitude of the relationship between the nodes as represented by a weighted value of a connecting edge of the graph.

7. A computer program product for augmenting a search query of a first user, based on analysis of content contributions of the first user, the computer program product comprising:

a computer readable storage medium having program instructions embodied therewith, wherein the computer readable storage medium is not a transitory signal per se, the program instructions executable by one or more processors, the program instructions comprising:

program instructions to gather content contributions submitted to a media source and generated by a first user of the media source and timeframe information associated with the electronic content contributions, wherein the electronic content contribution includes generation of electronic content by the first user and response actions by the first user to the electronic content posted by other users;

program instructions to perform semantic analysis and syntactic analysis on the content contributed to the media source by the first user of the media source;

program instructions to identify topic entities from the electronic content contributed to the media source by the first user of the media source, based on the semantic analysis and syntactic analysis performed on the electronic content contributed by the first user of the media source;

program instructions to determine, based on the semantic analysis and the syntactic analysis, attributes of the identified topic entities;

program instructions to group the identified topic entities based on related attributes of the identified topic entities;

program instructions to determine relationships between the identified topic entities including time-based relationships, based on one or more groups of the identified topic entities and the semantic and syntactic analysis of the content contributed by the first user of the media source;

program instructions to determine a strength of the relationships, respectively, between pairs of the identified topic entities indicated by a magnitude, wherein the magnitude is based on a frequency of association of the respective pairs of topic entities, a currency of the respective pairs of topic entities, a duration of association of the respective pairs of topic entities over a time period, and a quantity of content associating the respective pairs of topic entities;

program instructions to generate a graph based on an ontology model, comprised of a grouping of a plurality of the identified topic entities from the electronic content contributed by the first user, and the relationships between the identified topic entities, including the magnitude indicating the strength of the relationships, respectively, between the identified topic entities; and responsive to determining that a search query has been initiated by the first user, program instructions to present to the first user, additional topic entities for augmenting the search query, based on the ontology model, wherein the ontology model is represented by the plurality of the identified topic entities as nodes of a generated graph, the relationships between the plurality of the identified topic entities as edges of the graph, and the edges indicating the magnitude of the strength of the relationships interconnecting the nodes of the graph.

8. The computer program product of claim 7, wherein the content contributions include one or more of: posted text, posted comments, likes, tags, chat content, users followed, topics followed, posted images and transcripts of posted video.

9. The computer program product of claim 7, wherein the media source is one or more network based social media sites.

10. The computer program product of claim 7, wherein the ontology model includes a set of interrelated triples that include a topic entity as a subject, a second topic entity as an object, and a relationship between the subject and object as a predicate.

11. The computer program product of claim 7, wherein a relationship between topic nodes is positively reinforced by use of augmented search query topics from the graph based on the ontology model, and the relationship between topic nodes is negatively reinforced by a lack of use of the augmented search query topics from the ontology model, wherein a positive reinforcement and a negative reinforcement of the relationship between topic nodes modifies a magnitude of the relationship between the nodes as represented by a weighted value of a connecting edge of the graph.

12. A computer system for augmenting a search query of a first user, based on analysis of content contributions of the first user, the computer system comprising:
- one or more computer processors;
- one or more computer readable storage media; and
- program instructions stored on the computer readable storage media for execution by at least one of the one or more processors, the program instructions comprising:
  - program instructions to gather content contributions submitted to a media source and generated by a first user of the media source and timeframe information associated with the electronic content contributions, wherein the electronic content contribution includes generation of electronic content by the first user and response actions by the first user to the electronic content posted by other users;
  - program instructions to perform semantic analysis and syntactic analysis on the content contributed to the media source by the first user of the media source, based on the semantic analysis and syntactic analysis performed on the content contributed by the first user of the media source;
  - program instructions to identify topic entities from the electronic content contributed by the first user of the media source, based on the semantic analysis and syntactic analysis performed on the electronic content contributed by the first user of the media source;
  - program instructions to determine, based on the semantic analysis and the syntactic analysis, attributes of the identified topic entities;
  - program instructions to group the identified topic entities based on related attributes of the identified topic entities;
  - program instructions to determine relationships between the identified topic entities including time-based relationships, based on one or more groups of the identified topic entities and the semantic and syntactic analysis of the content contributed by the first user of the media source;
  - program instructions to determine a strength of the relationships, respectively, between the pairs of identified topic entities indicated by a magnitude, wherein the magnitude is based on a frequency of association of the respective pairs of topic entities, a currency of the respective pairs of topic entities, a duration of association of the respective pairs of topic entities over a time period, and a quantity of content associating the respective pairs of topic entities;
  - program instructions to generate a graph based on an ontology model, comprised of a grouping of a plurality of the identified topic entities from the electronic content contributed by the first user, and the relationships between the identified topic entities, including the magnitude indicating the strength of the relationships, respectively, between the identified topic entities; and
  - responsive to determining that a search query has been initiated by the first user, program instructions to present to the first user, additional topic entities as selection choices for augmenting the search query, based on the ontology model, wherein the ontology model is represented by the plurality of the identified topic entities as nodes of a generated graph, the relationships between the plurality of the identified topic entities as edges of the graph, and the edges indicating the magnitude of the strength of the relationships interconnecting the nodes of the graph.

13. The computer system of claim 12, wherein the ontology model includes a set of interrelated triples that include a topic entity as a subject, a second topic entity as an object, and a relationship between the subject and object as a predicate.

14. The computer system of claim 12, wherein a relationship between topic nodes is positively reinforced by use of augmented search query topics from the graph based on the ontology model, and the relationship between topic nodes is negatively reinforced by a lack of use of the augmented search query topics from the graph, wherein a positive reinforcement and a negative reinforcement of the relationship between topic nodes modifies a magnitude of the relationship between the nodes as represented by a weighted value of a connecting edge of the graph.

* * * * *